United States Patent [19]
Amine et al.

[11] Patent Number: 5,759,717
[45] Date of Patent: Jun. 2, 1998

[54] METHOD FOR MANUFACTURING A POSITIVE ELECTRODE ACTIVE MATERIAL FOR LITHIUM BATTERY

[75] Inventors: Khalil Amine; Hideo Yasuda; Yuko Fujita, all of Kyoto, Japan

[73] Assignee: Japan Storage Battery Co., Ltd., Kyoto, Japan

[21] Appl. No.: 727,925

[22] Filed: Oct. 9, 1996

Related U.S. Application Data

[62] Division of Ser. No. 634,803, Apr. 19, 1996.

[30] Foreign Application Priority Data

Apr. 26, 1995 [JP] Japan ................................. 7-127275

[51] Int. Cl.$^6$ .................................................. H01M 2/04
[52] U.S. Cl. ............................................ 429/218; 429/223
[58] Field of Search ................................. 429/218, 223, 429/59, 101; 423/594, 596

[56] References Cited

FOREIGN PATENT DOCUMENTS

| | | |
|---|---|---|
| 390185 | 3/1990 | European Pat. Off. . |
| 0 390 185 | 10/1990 | European Pat. Off. . |
| 4025208 | 2/1992 | Germany . |
| 4328755 | 3/1994 | Germany . |
| 07122299 | 10/1993 | Japan . |
| 9213367 | 8/1992 | WIPO . |
| 9218425 | 10/1992 | WIPO . |

OTHER PUBLICATIONS

J. Electrochem. Soc., vol. 137, No. 3 (Mar. 1990), pp. 769–775. *Electrochemistry of Maganese Dioxide in Lithium Nonaqueous Cell*, Tsutomu Ohzuku, Masaki Kitagawa, and Taketsugu Hirai.
Mat. Res. Bull., vol. 18 (1983), pp. 461–472. *Lithium Insertion Into Manganese Spinels*, M.M. Tackeray, W.I.F. David, P.G. Bruce, and J.B. Goodenough (month n/a).
Solid State Ionic 69 (1994), pp. 59–67. *Improved capacity retention in rechargeable 4 V lithium/lithium–manganese oxide (spinel) cells*, R.J. Gummow, A. de Kock, M.M. Thackeray (month n/a).
Journal of Power Sources, 43–44 (1993), pp. 223–231. *The SWING system, a nonaqueous rechargeable carbon metal oxide cell*, R. Bittihn, R. Herr and D. Hoge (month n/a).
Journal of Power Sources 52 (1994), pp. 185–192. *Determination of thermodynamic, kinetic and interfacial properties for the Li/Li$_x$Mn$_2$O$_4$ system by electrochemical techniques*, J. Barker, R. Pynenburg, R. Koksbang (month n/a).
J. Electrochem. Soc., vol. 183, No. 10 (Oct. 1991), pp. 2859–2864. *The Spinel Phase of LiMn$_2$O$_4$ as a Cathode in Secondary Lithium Cells*, J.M. Tarascon, E. Wang, and F.K. Shokoohi.
Japanese Patent Application Laid–Open No. 3–285262, filed Dec. 16, 1991.
Japanese Patent Application Laid–Open No. 63–274059, filed Nov. 11, 1988.
Japanese Patent Application Laid–Open No. 4–87268, filed Mar. 19, 1992.
The Spinal Phase of LiMn$_2$O$_4$ as a Cathode in Secondary Lithium Cells by Tarascon.
The Spinal Phases LiMyMn2–yO4 (M=Co, Cr, Ni) as the cathode for rechargeable lithium batteries by Li Guahua et al. Oct. 1991.

*Primary Examiner*—M. Nuzzolillo

[57] ABSTRACT

A method for manufacturing positive a electrode active material for a lithium battery represented by general formula Li$_x$Mn$_{2-y}$M$_y$O$_4$ (M: a 2-valency metal, $0.45 \leq y \leq 0.60$, $1 \leq x \leq 2.1$) having cubic spinel structure of and a lattice constant within 8.190 angstroms by employing a solid phase reaction, comprising the steps of firing a lithium compound, a manganese compound and a metal M compound and refiring the fired material after pressurizing it at least once to remove a metal M oxide.

4 Claims, 6 Drawing Sheets

METHOD FOR MANUFACTURING A POSITIVE ELECTRODE ACTIVE MATERIAL FOR LITHIUM BATTERY

This application is a divisional of copending application Ser. No. 08/634,803, filed on Apr. 19, 1996, the entire contents of which are hereby incorporated by reference, pending.

BACKGROUND OF THE INVENTION

1. Field of the Invention

The present invention relates to a positive electrode active material for lithium battery, more particularly, to a positive electrode active material based on lithium manganese spinel oxide wherein manganese is partially substituted with another metal, and a method for manufacturing the same.

2. Description of The Related Art

As positive electrode active material for lithium battery, manganese dioxide for primary battery and vanadium oxide ($V_2O_5$), lithium cobalt oxide ($LiCoO_2$), etc. for secondary battery have already been put in practical applications, while many other materials have been proposed including lithium nickel oxide ($LiNiO_2$), lithium manganese oxide ($LiMn_2O_4$). Among these materials, lithium manganese oxide is regarded as promising because of the low cost of the production, and nontoxicity of manganese.

Representative among lithium manganese oxides is the spinel oxide ($LiMn_2O_4$) which has a three dimensional structure. Charge and discharge reactions of a lithium secondary battery wherein manganese spinel oxide is used as the positive electrode active material take place in the following two stages.

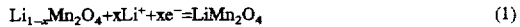

($\rightarrow$: Discharge, $\leftarrow$: Charge)

The discharge process represented by equation (1) takes place at a potential of about 4V with respect to a lithium reference electrode ($Li/Li^+$) with the crystal in this process having cubic structure, while the discharge reaction represented by equation (2) takes place at a potential of about 3V or lower with the crystal structure changing from cubic structure to tetragonal structure. Theoretical discharge capacity density is 154 mAh/g in both cases of equations (1) and (2).

However, as reported in J. Electrochem. Soc., 137, 769, (1990), etc., lattice constant changes resulting in a change in the unit cell volume in the discharge process of $Li_xMn_2O_4$ ($0<x\leq1$), despite the crystal structure remains it cubic structure. According to Mater. Res. Bull., 18, 461 (1983) and Solid State Ionics 69,59 (1994), when the value of x approaches 1 in the discharge process of $Li_xMn_2O_4$ ($0<x\leq1$) and further shifting to $Li_xMn_2O_4$ ($1\leq x\leq2$), the crystal structure changes from cubic structure to tetragonal structure due to the Jahn-Teller effect. At this time, a great change in the unit cell volume occurs because the value of crystal lattice constant ratio c/a increases by 16%.

Such a change in volume causes the electron collecting performance of the electrode to decrease, resulting in decrease in capacity. Because the volume change due to the Jahn-Teller effect is particularly substantial, it has been common to use the battery in the region of 4V corresponding to equation (1) or in the region of 3V corresponding to equation (2).

The decrease in the capacity with progress of charge and discharge processes in a battery employing lithium manganese spinel oxide as the positive electrode active material is also attributed to the dissolution of manganese ions included in the crystal into the electrolyte, as reported in J. Power Sources, 43–44, 223 (1993) and J. Power Sources, 52, 185 (1994). That is, average valency of manganese is over 3.5 during the process of equation (1), but decreases below 3.5 during the process of equation (2) during which the amount of trivalent manganese ion increases. With the presence of manganese ions having a valency of 3, a disproportionate reaction of equation (3) occurs where the produced divalent manganese ions are partially dissolved in the electrolyte of Lithium thereby, resulting in the decomposition of active material and the loss of the reversibility of the electrode.

The dissolution of manganese can also be observed through change of color of the organic electrolyte from colorless to light purplish red. Thus keeping the valency of manganese as high as possible is effective in preventing the decrease in capacity.

The Journal of Electrochemical Society, 138, (10), 2859 (1991) discloses an attempt of substituting part of manganese with another metal. It is reported that, in case nickel is employed as the substituting metal, when discharging in a range from 4.5V to 2.0V while changing the value of y in chemical formula $Li_xMn_{2-y}Ni_yO_4$, three potential plateaus are observed at 3.9V, 2.8V and 2.2V and the discharge capacity shows greater decrease at both 3.9V plateau and 2.8V plateau as the value of y increased. This doped spinel is prepared in solid phase reaction by means of firing, while using $Li_2CO_3$, $MnO_2$ and the oxide of the partially substituting metal as the starting materials.

In the Japanese Patent Application Laid-Open No.3-285262, it is reported that a good cycle characteristic is obtained from an electrode fabricated from a positive electrode active material represented by general formula $Li_{1+y}Mn_{2-z}A_zO_4$ ($0\leq y\leq 1$, $0<z\leq 0.5$, and A is at least one element selected from the group consisting of Ti, V, Cr, Mo, Ni and Fe), an electricity conducting agent and a binder. A battery employing $Li_{1.1}Mn_{1.8}CO_{0.2}O_4$ as the positive electrode active material and metallic sodium as the negative electrode active material, for example, shows discharge characteristic ranging from 4.1V to 3.7V.

The Japanese Patent Application Laid-Open No. 63-274059 discloses that a battery represented by a general formula $LiMn_2O_4$ employing a positive electrode active material, which shows X-ray diffraction peak of half-power width from 1.1 to 2.1° when irradiated with Fe(kα) line at a diffraction angle 46.1° and a negative electrode active material of metallic lithium has good discharge characteristic with discharge voltage being around 2.5V with a resistance of 1 kΩ. The positive electrode active material is manufactured through solid phase reaction with heat treatment being applied to lithium carbonate and manganese dioxide in air at a temperature from 400° to 520° C.

The Japanese Patent Application Laid-Open No. 4-87268 discloses that a battery represented by a general formula $Li_xMn_{2-y}Fe_yO_4$ ($0<x$, $0<y<2$) employing a manganese-iron-lithium compound oxide of spinel structure or similar spinel structure as the positive electrode active material and a laminated plate of aluminum and metallic lithium as the negative electrode active material shows discharge characteristic having discharge capacity which increases when the operating voltage is in high-voltage region of 3V and higher, while the discharge takes place in two stages. It is described that the active material is preferably manufactured in solid reaction by firing a mixture of oxides, hydroxides, carbonates, nitrates, etc. of Mn, Fe and Li in specified proportions in an atmosphere of air or oxygen at a temperature above 450° C., preferably from 600° to 1000° C.

In the prior art, as described above, there has been such problems that partial substitution of manganese in a spinel lithium manganese oxide with another metal exhibit two plateaus of 4V and 3V during the charge and discharge processes with the crystal structure changing as the charge and discharge processes are repeated, resulting in the expansion and contraction of the unit cell volume and a decrease in the capacity.

SUMMARY OF THE INVENTION

An object of the invention is to provide a positive electrode active material for a lithium battery where charge and discharge reactions proceed in one phase reaction and a monotonous variation of the potential can be obtained, and a method for manufacturing the same.

Another object of the invention is to provide a positive electrode active material for a lithium battery wherein the crystal structure does not change with charge and discharge reactions, the unit cell volume experiences less change and the capacity experiences less decrease as the charge and discharge operations are repeated, and a method for manufacturing the same.

The positive electrode active material for lithium battery of the invention is represented by a general formula $Li_xMn_{2-y}M_yO_4$ (M: a 2-valency metal selected from Ni, Co, Fe and Zn with $0.45 \leq y \leq 0.60$, $1 < x \leq 2.1$) having cubic spinel structure of lattice constant within 8.190 angstrom.

In the case solid phase reaction process is employed, the positive electrode active material is manufactured by repeating the process of firing lithium nitrate, manganese carbonate and nickel nitrate in a temperature range from 750° to 850° C. while applying pressure-treatment in the course.

In case the sol-gel process is employed, one of inorganic salt, hydroxide and organic acid salt of lithium or a mixture of these for Li, one of inorganic salt and organic acid salt of manganese or a mixture of these for Mn, and one of inorganic salt and organic acid salt of the selected metal or a mixture of these for M, are used as the starting materials for the synthesis. Gelling process to obtain gelatinous material by adding ammonia water to the solutions of these starting materials in alcohol or water and firing process to fire the gelatinous material, thus obtained, are carried out.

After synthesizing a compound $Li_xMn_{2-y}M_yO_4$ (x=1) by the sol-gel process described above, a solution of lithium iodine or n-butyl lithium is made to react with this compound to manufacture the compound $Li_xMn_{2-y}M_yO_4$ ($1 < x \leq 2$).

The above and further objects and features of the invention will more fully be apparent from the following detailed description with accompanying drawings.

BRIEF DESCRIPTION OF THE DRAWINGS

FIG. 6 shows the relationship between the value of y in $LiMn_{2-y}Ni_yO_4$ and the lattice constant a.

DESCRIPTION OF THE PREFERRED EMBODIMENTS

Nickel was selected as an example of partially substituting metal of doped manganese spinel oxide and method and conditions for synthesizing it were studied.

Figure 1:
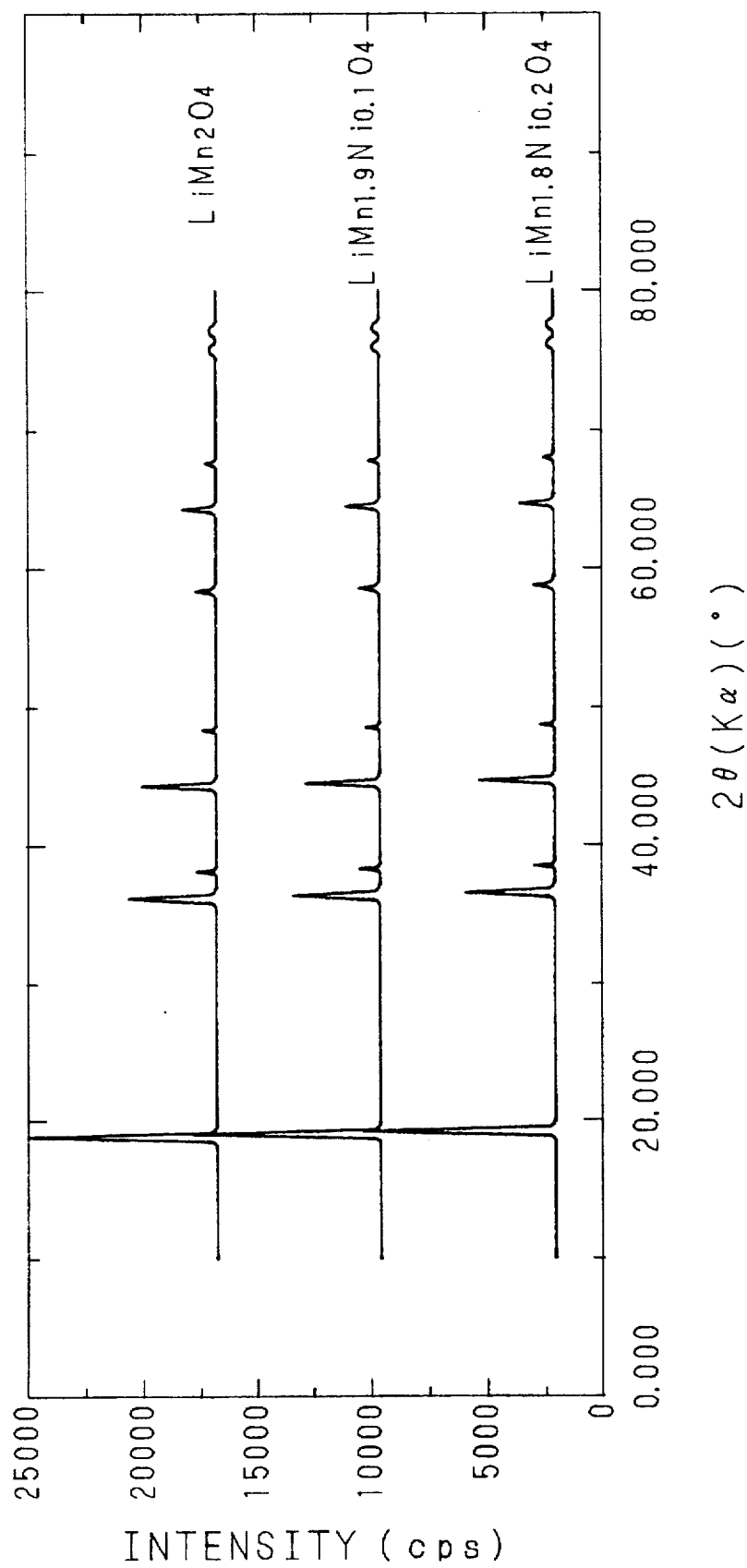
FIG. 1 shows X-ray diffraction patterns obtained by changing the amount of doped nickel (value of y) in the compound represented by general formula $LiMn_{2-y}Ni_yO_4$.

First, solid phase reaction process described previously was tried as the method of synthesis. Various amounts of doped nickel was tried for y=0, 0.1, 0.2, 0.4 and 0.5 in the general formula $LiMn_{2-y}M_yO_4$, while selecting $Li_2CO_3$, LiOH and $LiNO_3$ for the lithium source and selecting NiO, $Ni(OH)_2$, $Ni(NO_3)_2$ and $NiC_2O_4$ for the nickel source. As a result, when the value of y is within 0.2, doping of nickel causes the diffraction peak to shift toward greater angle though pure spinel was obtained. X-ray diffraction patterns of these materials (CuKα) are shown in FIG. 1.

However, when the value of y increases and particularly when it exceeds 0.2, it became difficult to substitute manganese with nickel, and impurity of NiO always remained. This tendency was observed regardless of the kind of starting materials.

Thus it was found that pure spinel could not be obtained when the proportion of manganese substituted with nickel exceeded 0.2, although study of various starting materials and synthesis conditions showed that pure $LiMn_{1.6}Ni_{0.4}O_4$ is difficult to obtain but could be obtained if lithium nitrate, manganese carbonate and nickel nitrate are used as starting materials, and if the recalcination process (firing temperature: 750° to 850° C. after pressurization is repeated several times.

Figure 2:
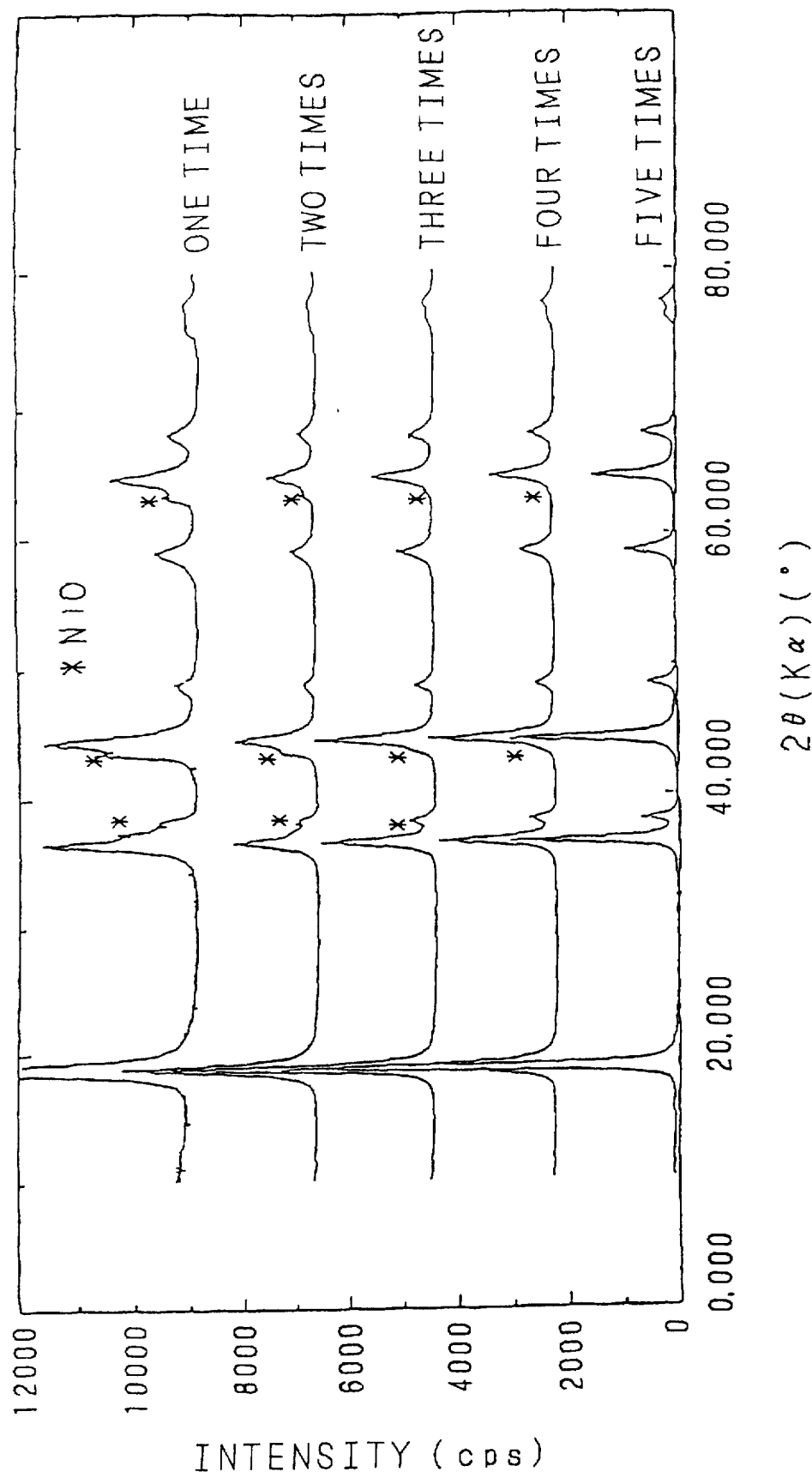
FIG. 2 shows X-ray diffraction patterns of $LiMn_{1.6}Ni_{0.4}O_4$ obtained by repeated refiring process.

FIG. 2 shows the effect of repeated refiring the product at a temperature of 750° C. It can be seen that, when the refiring process is repeated five times, the peaks corresponding to NiO disappear and a pure $LiMn_{1.6}Ni_{0.4}O_4$ with a spinel structure can be obtained.

Even when the value of y is 0.5, pure $LiMn_{1.5}Ni_{0.5}O_4$ of spinel structure was obtained by using lithium nitrate, manganese carbonate and nickel nitrate as the starting materials and repeating the refiring process.

In order to study the electro-chemical properties of pure $LiMn_{2-y}M_yO_4$ powder obtained as described above, a Flooded cell was made by using as test electrode a pellet electrode made from Ketjen black as electron conducting material, PTFE as binder and stainless mesh as electron collector, two metallic lithium electrodes as opposing electrodes and a mixture solution of ethylene carbonate and diethylcarbonate (1:1) including 1M of $LiClO_4$ as the electrolyte. Charge and discharge characteristic was studied by discharging to 2V after charging to 4.3V with a current density of 0.5 mA/cm$^2$.

Figure 3:
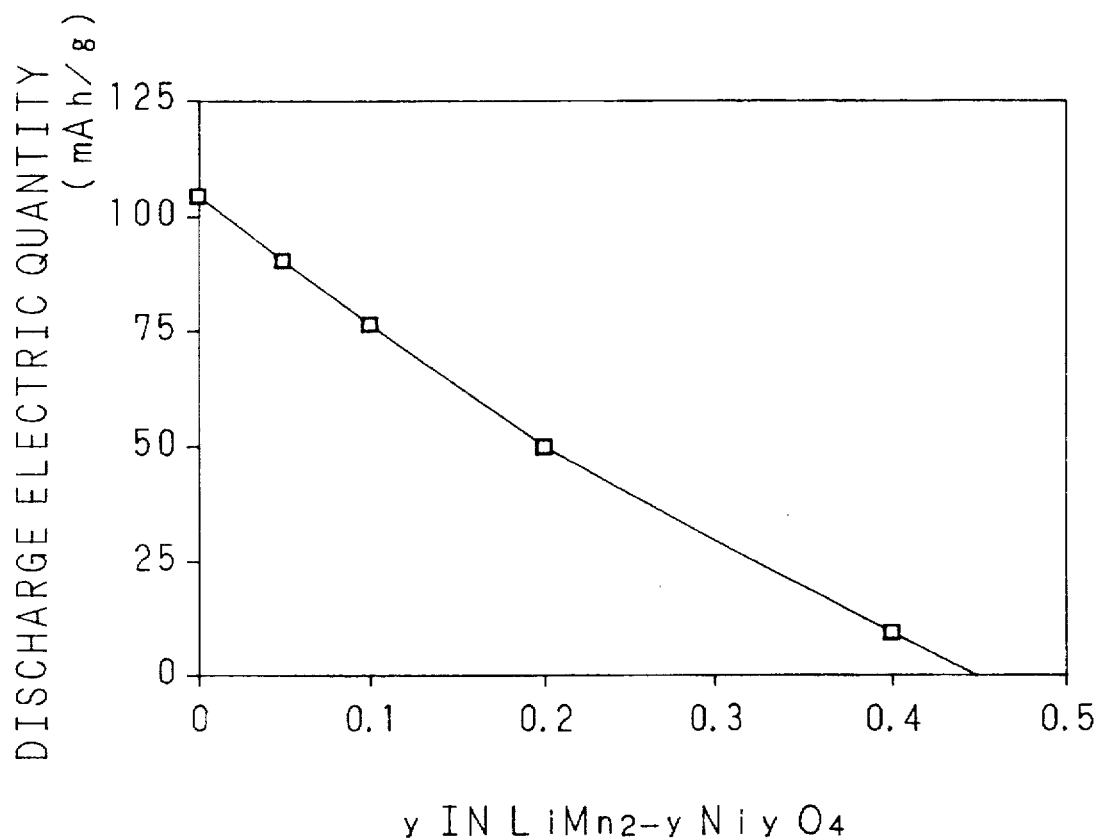
FIG. 3 shows the relationship between the value of y in $LiMn_{2-y}Ni_yO_4$ and the capacity showing a voltage of 4V (voltage range from 4.3V to 3.5V).

In either case, the discharge process took place in two stages of 4V and 3V. Thus it is supposed that change from cubic structure to tetragonal structure due the Jahn-Teller effects occurred. FIG. 3 shows the relationship between the value of y in $Li_xMn_{2-y}Ni_yO_4$ and the capacity showing a voltage of 4V (voltage range from 4.3V to 3.5V). It can be seen that the capacity showing 4V decreases as the value of y increases. Value of y at which the capacity becomes 0 is around 0.45. This is supposed to indicate that the discharge characteristic does not show potential change of two stages when the value of y becomes 0.45 resulting in pure $LiMn_{2-y}M_yO_4$.

Then sol-gel preparation of the nickel doped spinel (firing temperature: 300° to 400° C.) was investigated by using manganese acetate (II), nickel acetate and lithium nitrate as the starting materials and carbon black as gel stabilizing agent. It was found that pure spinel structure can be obtained much easier than in the case of the solid phase reaction described previously even when the value of y in $LiMn_{2-y}Ni_yO_4$ is 0.5, namely with the composition of $LiMn_{1.5}Ni_{0.5}O_4$.

This reaction is assumed to proceed as follows.

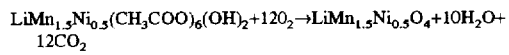
$LiMn_{1.5}Ni_{0.5}(CH_3COO)_6(OH)_2 + 12O_2 \rightarrow LiMn_{1.5}Ni_{0.5}O_4 + 10H_2O + 12CO_2$ X-ray diffraction analysis of the obtained $LiMn_{1.5}Ni_{0.5}O_4$ showed a spinel structure having lattice constant of 8.174 angstrom. Ion chromatography and atomic absorption analysis showed that its chemical composition was $Li_{1.03}Mn_{(1.56+0.05)}Ni_{(0.52+0.0.504)}O_4$ and $Li_{0.99}Mn_{(1.56+0.05)}Ni_{(0.52+0.05)}O_4$.

As the starting material of the compound described above in the sol-gel process, organic acid salts such as formic acid salt, oxalic acid salt, citric acid salt and butyric acid salt, acetylacetonate complex, nitrate and sulfate are effective besides acetate described above for manganese, organic acid salts and inorganic salts similar to those used in the case of manganese are effective besides acetate described above for nickel and various partially substituting metals other than nickel, and various organic acid salts, inorganic salts and hydroxides besides nitrate described above can be used for lithium.

As for the gel stabilizing agent, carbon black is the best suited because it can be used as electron conducting material as it is the case when preparing an electrode as described previously, while carbons other than carbon black and materials having viscous property such as gelatine and polyvinyl alcohol which have been in public knowledge may also be used.

Then $LiMn_{1.5}Ni_{0.5}O_4$ prepared with the process described above and a solution of lithium iodine (LiI) in acetonitrile are made to react for further intercalation of lithium. When using a stoichiometric mixture of lithium iodine, a compound represented by the chemical formula $Li_{(1.35-1.42)}Mn_{1.5}Ni_{0.5}O_4$ was obtained, whereas, the use of substantial excess of lithium iodine leads to the first successful generation of compound represented by the chemical formula $Li_2Mn_{1.5}Ni_{0.5}O_4$.

Figure 4:
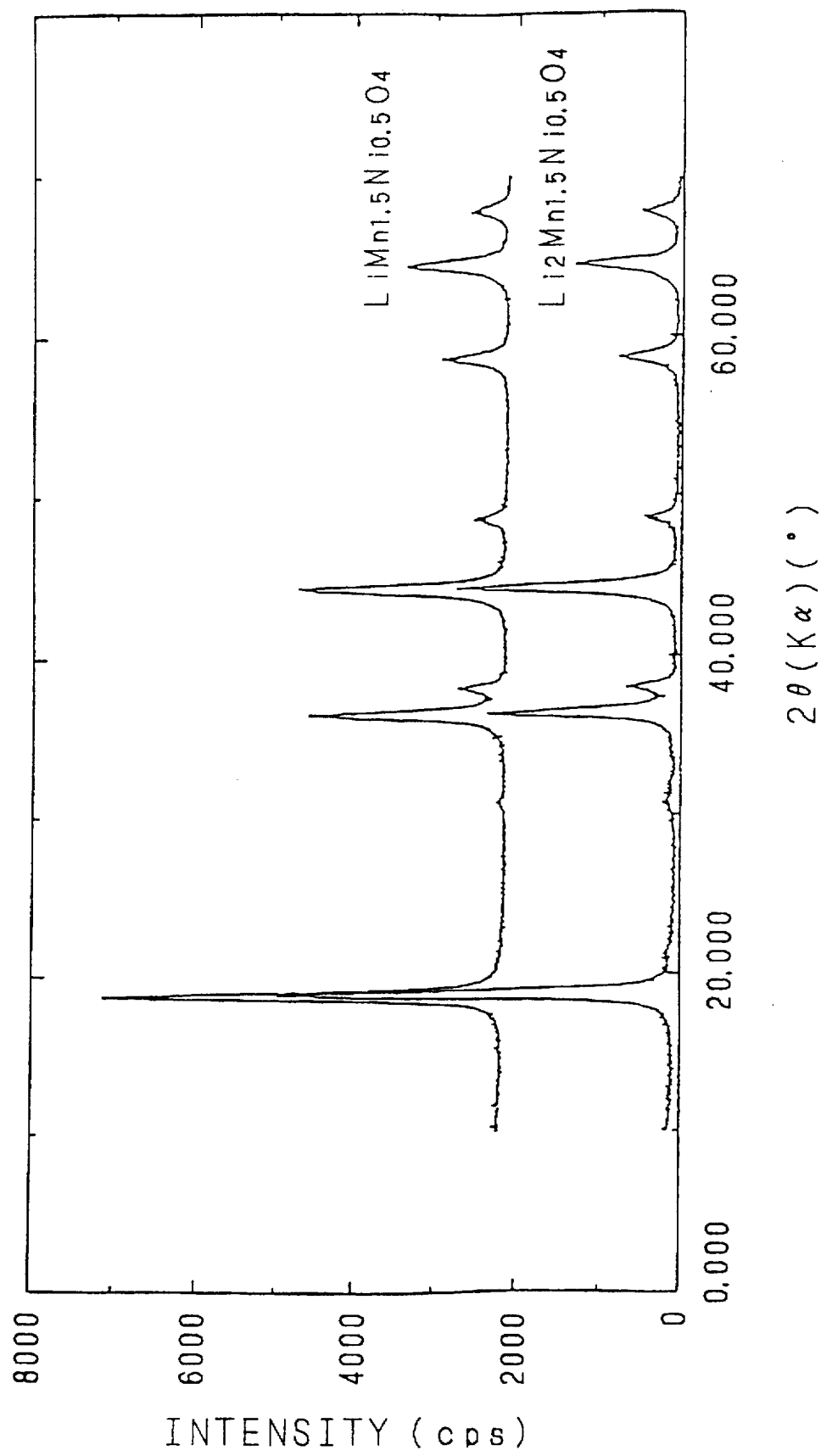
FIG. 4 shows X-ray diffraction patterns of $LiMn_{1.5}Ni_{0.5}O_4$ and $Li_2Mn_{1.5}Ni_{0.5}O_4$.

X-ray diffraction patterns (CuKα) obtained before ($LiMn_{1.5}Ni_{0.5}O_4$) and after ($Li_2Mn_{1.5}Ni_{0.5}O_4$ the intercalation of lithium using lithium iodine are shown in FIG. 4. From FIG. 4, it can be seen that both compounds before and after lithiation show cubic spinel structure and the basic structure does not change (with nickel-doped compound shifting slightly toward high-angle side). Similar effect was achieved by using n-butyl lithium instead of lithium iodine.

It has been said that discharge of lithium manganese spinel occurs at two stages of 4V and 3V with the crystal structure changing from cubic to tetragonal structure due to the Jahn-Teller effect as described previously. However, $LiMn_{1.5}Ni_{0.5}O_4$ of the present invention shows a new behavior that the cubic structure does not change even after discharging, namely intercalation of lithium, takes place.

Figure 5A:
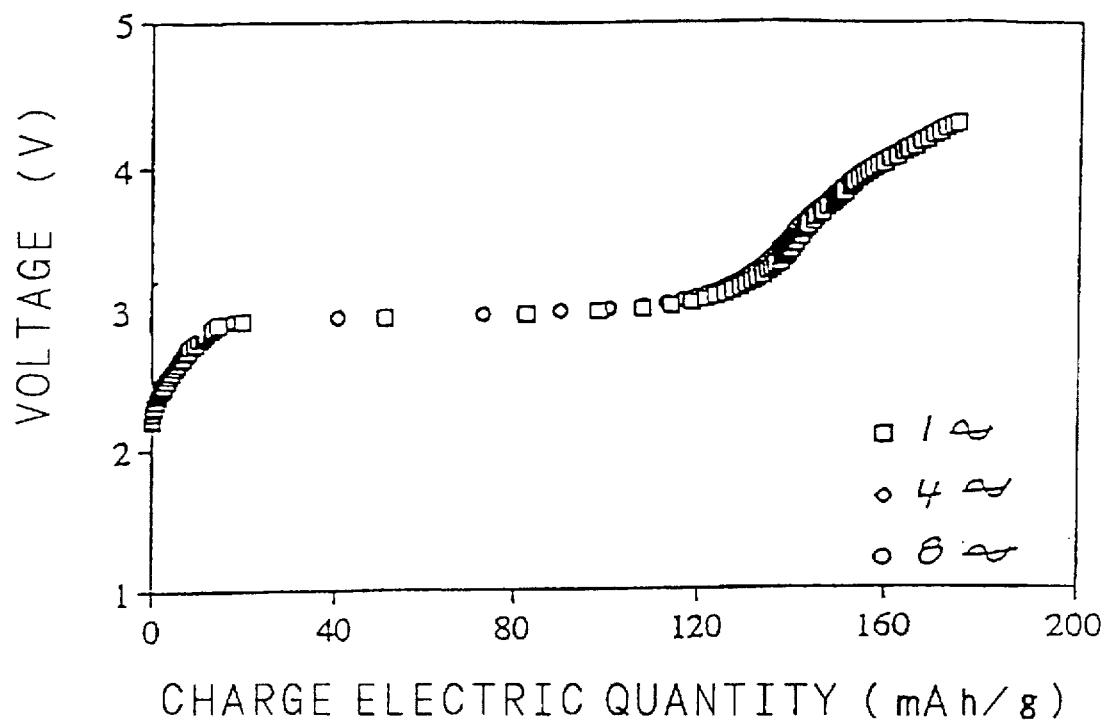
FIG. 5A shows charge characteristic of a case where $LiMn_{1.5}Ni_{0.5}O_4$ of the invention is used.
Figure 5B:
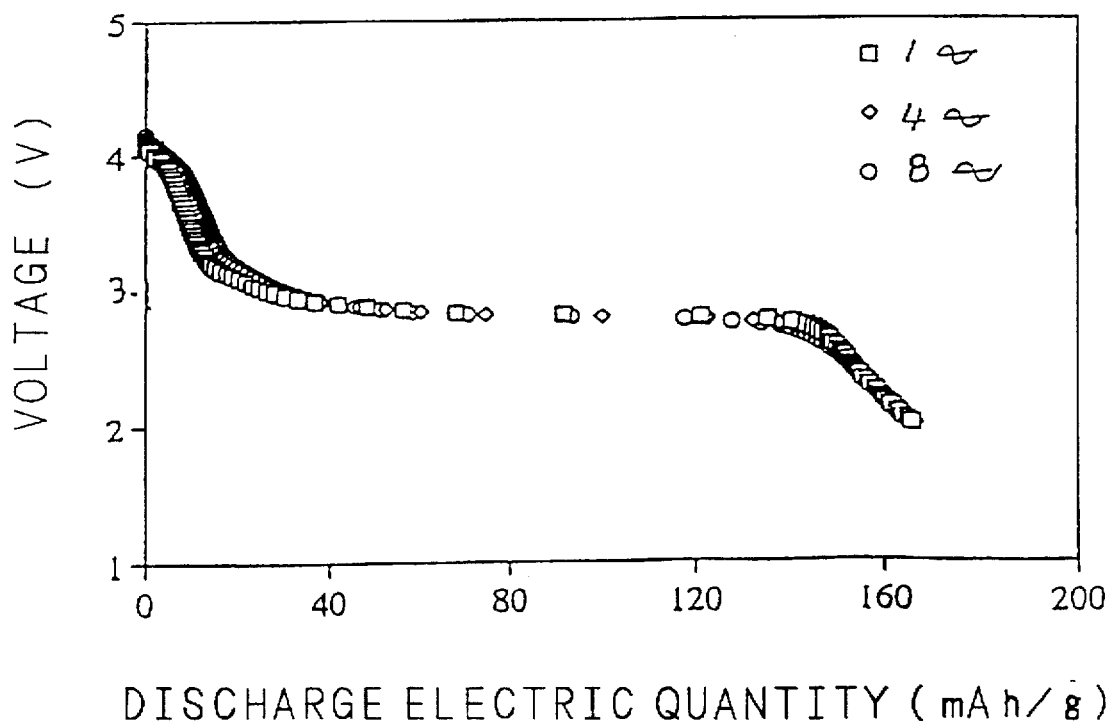
FIG. 5B shows discharge characteristic of a case where $LiMn_{1.5}Ni_{0.5}O_4$ of the invention is used.

The electrochemical characteristics of $LiMn_{1.5}Ni_{0.5}O_4$ electrode was investigated using a Flooded type cell described previously. Charge and discharge processes were carried out at a current density of 0.5 mA/cm² in a range from 4.3V to 2.0V (against $Li/Li^+$). FIGS. 5A and 5B show the charge and discharge characteristics of the material. From these figures, it can be seen that the discharge capacity of the material average from 160 to 180 mAh/g far greater than that of conventional $LiMn_2O_4$ which does not include nickel and, even after repeatedly charging and discharging the cell, no significant change in the capacity is observed indicating excellent reversibility. Moreover, the observed flat charge and discharge is different from that of the prior art where two or more stages plateaus has been reported.

X-ray diffraction analysis of active material after discharging and charging by using $LiMn_{1.5}Ni_{0.5}O_4$ showed that the cubic structure was maintained similarly to the case shown in FIG. 4. And the electrolyte did not exhibit any color change which could reflect the dissolution of $Mn^{2+}$ ions.

Therefore, the discharge and charge reactions of $LiMn_{1.5}Ni_{0.5}O_4$ of the invention are supposed to proceed in one phase reaction and the material can be considered to be a new active material essentially different from conventional ones. Further, this result is absolutely different from the case of $LiMn_{2-y}Ni_yO_4$ which has been reported in the prior art wherein increase in the value of y causes the discharge capacity to decrease substantially in 3V region as well as in 4V region resulting in not only cancellation of the effect of nickel doping but an adverse effect thereof and at least two plateaus at 4V and 3V still remain when charging and discharging the material.

Causes of the effects of the invention will now be discussed. As for the method and conditions for synthesis, it can be said that differences in the starting materials and firing condition in the solid phase reaction process and difference between the solid phase reaction and sol-gel process have significant effects on the difference in the charge and discharge characteristics, as described previously.

That is, it is supposed that the conventional one includes impurities remaining therein in addition to the spinel oxide, and the impurity causes the substantially decrease of the charge and discharge characteristics than in the case of the invention. In other words, it is very important to turn the material into pure spinel oxide.

As for the difference between the cases where the value of y is within 0.4 and 0.5 in $LiMn_{2-y}Ni_yO_4$, average valency of manganese is 3.88 and 4.00 when the value of y is 0.4 and 0.5, respectively. That is, when the value of y is within 0.4, manganese includes 3-valency state besides 4-valency, while manganese is 4-valency when y=0.5, and this is supposed to result in high capacity achieved stably.

Figure 6:
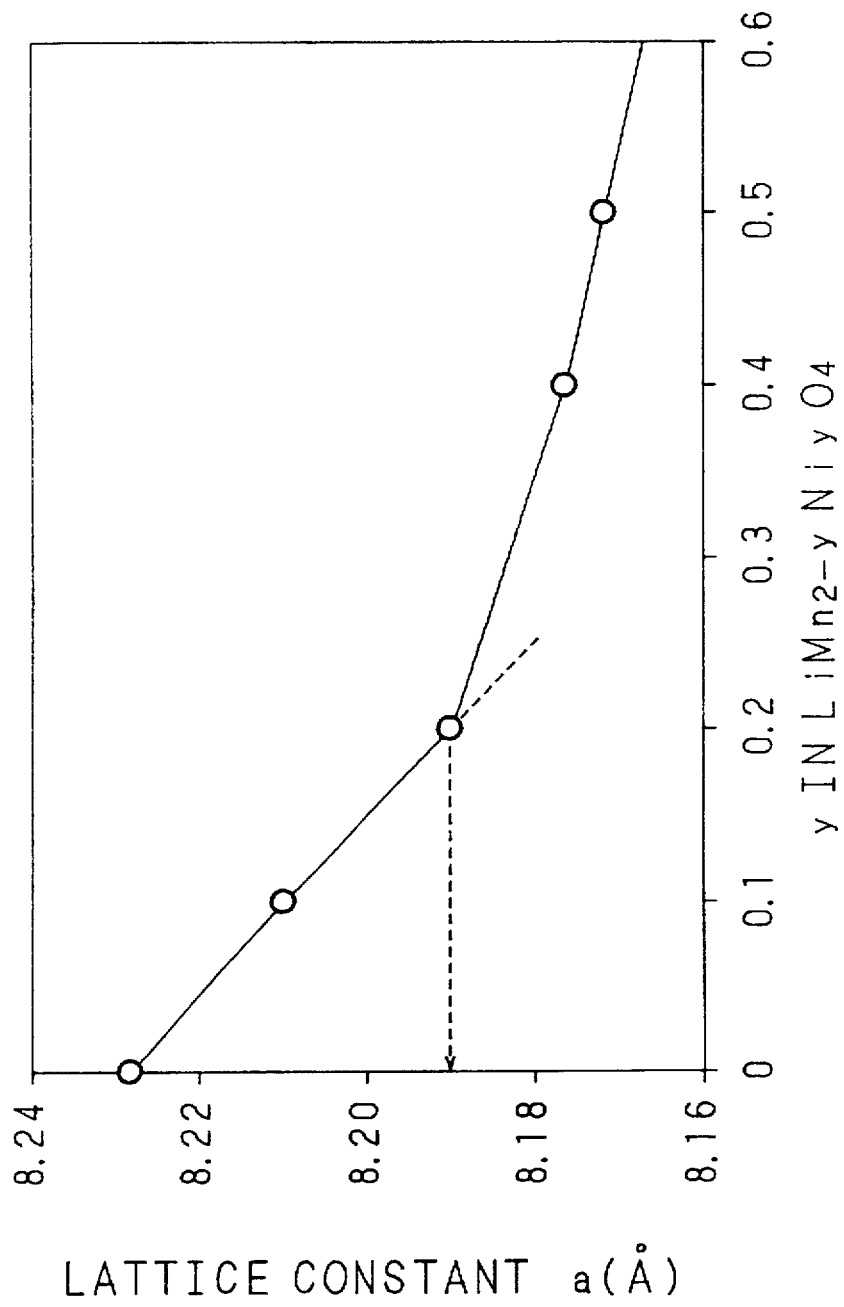

Relation of the value of y and lattice constant a in $LiMn_{2-y}Ni_yO_4$ which does not include impurities such as NiO obtained by X-ray diffraction analysis is shown in FIG. 6. The lattice constant a decreases as the value of y increases and, in particular, the rate of decrease changes when the value of y exceeds 0.2.

This changes takes place when the lattice constant a is 8.190 angstrom. Considering together the fact that continuous voltage characteristic without stepwise charging and discharging characteristics is obtained when the value of y is 0.45 or greater, it can be said that lithium manganese oxide which does not show two or more stages of plateaus in the charge and discharge characteristics and maintains cubic spinel structure is represented by $Li_xMn_{2-y}Ni_yO_4$ where y is in a range of $0.45 \leq y$ and x is in a range $1 \leq x \leq 2.1$ having cubic spinel structure of lattice constant within 8.190 angstrom. When the value of y is 0.6 or greater, the material is not economically suitable because adding more nickel make it more expensive. Therefore value of y is preferably within a range $0.45 \leq y \leq 0.60$.

While outline of the invention has been described by taking a case of using nickel as the metal partially substituting manganese, similar effects can also be obtained when a 2-valency metal such as cobalt ($Co^{2+}$), iron ($Fe^{2+}$) and zinc ($Zn^{2+}$) is used as the partially substituting metal in $Li_xMn_{2-y}Ni_yO_4$.

Meanwhile, $Mn_{2-y}$ in $Li_x Mn_{2-y}O_4$ can be expressed as $Mn_{1-y}^{3+}Mn^{4+}$, and $Li_xMn_{2-y}Ni_yO_4$ becomes $Li_xMn_{1-y}^{3+}Mn^{4+}M_yO_4$. Here 3-valency manganese ($Mn^{3+}$) having spinel structure which causes Jahn-Teller distortion has an adverse effect. Thus single-stage potential plateau can be achieved in the discharging process by substituting $Mn_{1-y}^{3+}$ with another 3-valency metal. Namely, similar effect can be achieved by using either one of iron ($Fe^{3+}$), nickel ($Ni^{3+}$), aluminum ($Al^{3+}$), cobalt ($Co^{3+}$), boron ($B^{3+}$,) and vanadium ($V^{3+}$,) OF two or more of these 3-valency metals as M in $Li_xMn_{2-z}M_zO_4$ with $0.5 \leq z \leq 1$. The range $0.5 \leq z \leq 1$ is determined because value of z below 0.5 leads to the Jahn-Teller effect resulting in 2-stage reaction in the discharge process.

Now embodiments of the invention will be described below.

Example 1

$LiMn_{1.5}Ni_{0.5}O_4$ was synthesized using the sol-gel process. First, solutions of manganese acetate (II) (4 g), nickel acetate (II) (1.5 g) and lithium nitrate (0.75 g) dissolved in 50 ml, 80 ml and 40 ml of ethyl alcohol or water, respectively, were mixed and stirred vigorously. Then 30 mg of carbon black was added as gel stabilizing agent. Carbon black also serves as repressor of $Mn_2O_3$ generation in the final compound.

After stirring for 30 minutes, 30 ml of 25% ammonia water was added. Precipitated substance thus obtained was dried in a rotary evaporator under vacuum, resulting in a viscous gel-like substance being produced. By coating a titanium foil with this substance and firing it at 400° C. in air for three days, the positive electrode of the invention was obtained.

X-ray diffraction analysis of this sample shows that diffraction peaks of this active material is broad and lattice constant is 8.169 angstrom which is smaller than that of the conventional lithium manganese spinel $LiMn_2O_4$ (8.23 angstrom). Ion chromatography and atomic absorption analysis of the sample obtained showed that chemical composition thereof is $Li_{1.03}Mn_{1.5}Ni_{0.5}O_4$ and $Li_{0.99}Mn_{1.5}Ni_{0.5}O_4$, respectively.

Example 2

Similarly to Example 1, $LiMn_{1.5}Ni_{0.5}O_4$ was synthesized in sol-gel process. Namely, solutions of manganese acetate (II) (4 g), nickel acetate (II) (1.35 g) and lithium nitrate (0.75 g) dissolved in 50 ml, 80 ml and 40 ml of ethyl alcohol or water, respectively, were mixed and stirred vigorously. Then 30 mg of carbon black was added as gel stabilizing agent. After stirring for 30 minutes, 30 ml of 25% ammonia water was added. Precipitated substance thus obtained was dried in a rotary evaporator under vacuum, resulting in a viscous gel-like substance being produced. By firing this substance at 400° C. in air for three days, $LiMn_{1.5}Ni_{0.5}O_4$ powder of the invention was obtained.

0.5 g of this powder and a solution made by dissolving 3.5 g of LiI in 50 ml of acetonitrile were mixed to react at 80° C. for 13 hours. Then the sample was rinsed with acetonitrile and dried at 50° C. to obtained $Li_2Mn_{1.5}Ni_{0.5}O_4$ of the invention. Ion chromatography and atomic absorption analysis of the sample obtained showed that chemical composition thereof is $Li_{2.08}Mn_{1.5}Ni_{0.5}O_4$ and $Li_{2.02}Mn_{1.5}Ni_{0.5}O_4$, respectively.

Then the powder thus obtained, carbon black and polyethylene tetrafluoride were mixed and wrapped in a stainless steel mesh then pressed to make an electrode. Using this electrode as positive electrode, a lithium foil as negative electrode, a solution (1:1) of 1M $LiClO_4$–EC (ethylene carbonate)+DEC (diethyl carbonate) as the electrolyte, and a lithium reference electrode, a cell was formed. When this cell was operated with current density of 0.5 mA/cm$^2$ and voltage range from 2 to 43V (Li/Li$^{3o}$) to determine the charge and discharge characteristics, discharge capacity with ending voltage of 2.0V (Li/Li$^+$) was from 160 mAh/g to 180 mAh/g. The discharge capacity showed no significant difference after repeating the charging and discharging cycles 30 times. The electrolyte showed no light purplish red coloration at all at the 30th cycle.

Charging and discharging reactions of the lithium manganese spinel oxide according to the invention proceed in uniform one phase reaction and continuous flat voltage characteristic can be obtained. Moreover, the cubic spinel structure is maintained as the charging and discharging cycles are carried out, with less change in unit cell volume resulting in better cycliability. Therefore, a new 3V class battery of good service life can be made by using carbon, graphite, metallic lithium or lithium alloy as the negative electrode active material.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method for manufacturing positive a electrode active material for a lithium battery represented by general formula $Li_xMn_{2-y}M_yO_4$ (M: a 2-valency metal consisting of Ni, Co, Fe and Zn, $0.45 \leq y \leq 0.60$, $1 \leq x \leq 2.1$) having cubic spinel structure of and a lattice constant within 8.190 angstroms by employing a solid phase reaction, comprising the steps of:

firing a lithium compound, a manganese compound such as manganese carbonate and a metal M compound consisting of Ni, Co, Fe, and Zn; and refiring the fired material after pressurizing it at least once to remove the metal M oxide.

2. The method of claim 1, wherein the metal is nickel.

3. The method of claim 2, wherein the lithium compound is lithium nitrate, the manganese compound is manganese carbonate and the metal M compound is nickel nitrate.

4. The method of claim 1, wherein a firing temperature of the firing and refiring steps is in a range from 650° to 850° C.

* * * * *